United States Patent
Li et al.

(10) Patent No.: US 9,824,085 B2
(45) Date of Patent: Nov. 21, 2017

(54) PERSONAL LANGUAGE MODEL FOR INPUT METHOD EDITOR

(75) Inventors: Mu Li, Beijing (CN); Xi Chen, Tianjin (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/423,914

(22) PCT Filed: Aug. 31, 2012

(86) PCT No.: PCT/CN2012/080818
§ 371 (c)(1),
(2), (4) Date: Feb. 25, 2015

(87) PCT Pub. No.: WO2014/032266
PCT Pub. Date: Mar. 6, 2014

(65) Prior Publication Data
US 2015/0186362 A1    Jul. 2, 2015

(51) Int. Cl.
*G06F 17/28* (2006.01)
*G06F 17/22* (2006.01)
*G06F 17/27* (2006.01)

(52) U.S. Cl.
CPC ...... *G06F 17/2863* (2013.01); *G06F 17/2223* (2013.01); *G06F 17/276* (2013.01)

(58) Field of Classification Search
USPC .............................................. 704/1–20, 257
See application file for complete search history.

(56) References Cited

U.S. PATENT DOCUMENTS

| 5,701,462 | A  | * | 12/1997 | Whitney ........... G06F 17/30067 707/758 |
| 6,023,697 | A  | * | 2/2000  | Bates ..................... G06F 9/4446 |
| 6,321,219 | B1 | * | 11/2001 | Gainer ............. G06F 17/30067 |
| 6,356,866 | B1 | * | 3/2002  | Pratley ................ G06F 17/2863 704/9 |
| 6,389,386 | B1 | * | 5/2002  | Hetherington ...... G06F 17/2863 704/8 |
| 9,086,735 | B2 | * | 7/2015  | Wang ..................... G06F 3/018 |

(Continued)

FOREIGN PATENT DOCUMENTS

| CN | 101833547 | 9/2010 |
| CN | 102508554 | 6/2012 |

(Continued)

OTHER PUBLICATIONS

PCT International Preliminary Report on Patentability dated Mar. 12, 2015 for PCT Application No. PCT/CN2012/080818, 6 pages.

(Continued)

*Primary Examiner* — Abul Azad
(74) *Attorney, Agent, or Firm* — Jacob P. Rohwer; Newport IP, LLC (57) ABSTRACT

Some examples include generating a personal language model based on linguistic characteristics of one or more files stored at one or more locations in a file system. Further, some implementations include predicting and presenting a non-Latin character string based at least in part on the personal language model, such as in response to receiving a Latin character string via an input method editor interface.

15 Claims, 7 Drawing Sheets

(56) References Cited

U.S. PATENT DOCUMENTS

| | | | |
|---|---|---|---|
| 2004/0201607 A1 | 10/2004 | Mulvey et al. | |
| 2005/0065931 A1* | 3/2005 | Ebrahimi | G06F 3/018 |
| 2005/0209844 A1 | 9/2005 | Wu et al. | |
| 2008/0221866 A1* | 9/2008 | Katragadda | G06F 17/2223 704/8 |
| 2008/0312910 A1 | 12/2008 | Zhang | |
| 2010/0088303 A1 | 4/2010 | Chen et al. | |
| 2010/0217795 A1 | 8/2010 | Hong | |
| 2010/0309137 A1 | 12/2010 | Lee | |
| 2011/0137635 A1* | 6/2011 | Chalabi | G06F 17/2863 704/2 |
| 2012/0016658 A1* | 1/2012 | Wu | G06F 3/018 704/3 |
| 2012/0166182 A1* | 6/2012 | Ko | G06F 17/276 704/9 |
| 2013/0132871 A1* | 5/2013 | Zeng | G06F 3/048 715/762 |
| 2013/0173530 A1* | 7/2013 | Laron | G06F 17/30165 707/608 |

FOREIGN PATENT DOCUMENTS

| | | | |
|---|---|---|---|
| WO | WO 03060451 A1 * | 7/2003 | G06F 3/0237 |
| WO | WO2014032266 | 3/2014 | |

OTHER PUBLICATIONS

The European Office Action dated Sep. 23, 2015 for European patent application No. 12883645.9, a foreign counterpart application of U.S. Appl. No. 14/423,914, 6 pages.

The Supplemental European Search Report dated Sep. 11, 2015 for European Patent Application No. 12883645.9, 3 pages.

Pei-feng, et al., "A Dynamic and Self-study Language Model Oriented to Chinese Characters Input", Proceedings of the Seventh ACIS International Conference on Software Engineering, Artificial Intelligence, Networking, and Parallel/Distributed Computing (SNPD'06), IEEE, 2006, pp. 311-318.

Gao, et al., "Toward a Unified Approach to Statistical Language Modeling for Chinese", ACM Transactions on Asian Language Information Processing, vol. 1, No. 1, Mar. 2002, 32 pgs. http://research.microsoft.com/en-us/um/people/joshuago/talip01.pdf.

Unknown, "Google Pinyin Input Method", retrieved Jun. 20, 2011, http://www.my-new-chinese-love.com/google-pinyin-input-method.html, 4 pages.

Scott, et al. "Engkoo: Mining the Web for Language Learning", In Annual Meeting of the Association of Computational Linguistics, published on Jun. 21, 2011, 6 pgs., http://www.aclweb.org/anthology-new/P/P11/P11-4008.pdf.

Unknown, "Windows Vista Chinese Pinyin Setup", published Aug. 28, 2008, 7 pgs. http://www.pinyinjoe.com/vista/vista_pinyin_setup_p2_fanti.htm.

"Second Office Action Issued in Chinese Patent Application No. 201280075554.7", dated Jun. 14, 2017, 9 Pages.

* cited by examiner

PERSONAL LANGUAGE MODEL FOR INPUT METHOD EDITOR

CROSS REFERENCE TO RELATED APPLICATIONS

This application is a 35 U.S.C. 371 National Stage application of International Application No. PCT/CN2012/080818, filed Aug. 31, 2012, the entire contents of which are incorporated herein by reference.

TECHNICAL FIELD

This disclosure relates to the technical field of computer input.

BACKGROUND

An input method editor (IME) is a computer functionality that assists a user to input text into a host application of a computing device. An IME may provide several suggested words and phrases based on received inputs from the user as candidates for insertion into the host application. For example, the user may input one or more initial characters of a word or phrase and an IME, based on the initial characters, may provide one or more suggested words or phrases for the user to select a desired one.

For another example, an IME may also assist the user to input non-Latin characters such as Chinese. The user may input Latin characters through a keyboard. The IME returns one or more Chinese characters as candidates for insertion. The user may then select the proper character and insert it. As many typical keyboards support inputting Latin characters, the IME is useful for the user to input non-Latin characters using a Latin-character keyboard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for predicting a non-Latin character string based at least in part on a personal language model. The personal language model may be generated based on linguistic characteristics of one or more files stored at one or more locations in a file system. The locations may be identified by a user. The predicted non-Latin character string may be provided in response to receiving a Latin character string via an input method editor interface. Additionally, some examples may predict a Chinese character string based at least in part on the personal language model in response to receiving a Pinyin character string.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Some examples include techniques and arrangements for implementing a personal language model with an input method editor (IME). For instance, it may be difficult for a user to input characters into a computer for a language that is based on non-Latin characters (e.g., the Chinese language). For example, there are thousands of Chinese characters, and a typical Western keyboard is limited to 26 letters. The present disclosure relates to an IME that predicts a non-Latin character string in response to receiving a Latin character string from a user. The predicted non-Latin character string is based at least in part on a personal language model associated with that user. As an illustrative, non-limiting example, the IME may be used to translate Pinyin text (i.e., Chinese characters represented phonetically by Latin characters) into Chinese characters. It will be appreciated that the present disclosure is not limited to Chinese characters. For example, other illustrative non-Latin characters may include Japanese characters or Korean characters, among other alternatives.

Among Chinese input method editors, those based on Pinyin text are the most common. Chinese Pinyin is a set of rules that utilize the Latin alphabet to annotate the pronunciations of Chinese characters. In a typical Pinyin IME, users input the Pinyin text of the Chinese they want to input into the computer, and the IME is responsible for displaying all the matched characters. However, many Chinese characters have the same pronunciation. That is, there is a one-to-many relationship between the Pinyin text and the corresponding Chinese characters. To predict a non-Latin character string, an IME may rely on a language model. For example, a statistical language model (SLM) may be used to compute a conversion probability of each possible conversion and may select the one with the highest probability for presentation to a user. A particular type of SLM, referred to as an N-gram SLM, may decompose the probability of a string of consecutive words into the products of the conditional probabilities between two, three, or more consecutive words in the string.

An IME may be released with a language model for generic usage (i.e., a "general" language model), which is trained for most common typing scenarios. However, such a general language model may be inadequate for a user associated with a specific "domain" (e.g., interests, professions). That is, different users may be associated with different domains (e.g., interests, professions), and an IME that utilizes a general language model may suggest a word or phrase that may be inappropriate for a user from a particular domain. To illustrate, an IME that utilizes a general language model may suggest a first word or phrase (i.e., a first set of non-Latin characters). The first word or phrase may have the same pronunciation as a second word or phrase (i.e., a second set of non-Latin characters). The first word or phrase may be appropriate for a standard user but may be less appropriate for a user associated with a particular domain. Instead, the second word or phrase may be more appropriate for such a user associated with the particular domain.

The present disclosure describes an IME that utilizes a personal language model that is personally adapted for a particular user based on content included in particular files (e.g., documents) stored locally by the particular user. As an illustrative, non-limiting example, a software developer may have one or more documents related to information technology stored locally, while a journalist may have one or more documents related to journalism stored locally. With the present disclosure, the language model for each user may be personalized based at least in part on locally stored documents of the particular user, such that the IME may more accurately predict the non-Latin characters. To illustrate, the IME of the software developer may predict a non-Latin character string that is more appropriate for the software developer than a non-Latin character string predicted based on the general language model. Similarly, the IME of the journalist may predict a non-Latin character string that is more appropriate for the journalist than a non-Latin character string predicted based on the general language model.

The IME of the present disclosure relies on one or more stored documents of a particular user that may or may not be typed by that particular user. That is, there may be domain materials (e.g., text books, historical case studies) stored locally that may be useful in developing a personal language model but that may not necessarily be typed by that particular user. As an illustrative example, a doctor may have numerous medical case studies stored locally. Some of these case studies may be written by the doctor, while others may be written by others and collected by the doctor for research. From these documents, a personal language model may be generated which reflects the linguistic characteristics of the user's domain interest (i.e., domain specific terms and how sentences are composed).

A user may identify one or more locations where files that are related to the particular user's domain are locally stored. To illustrate, a software developer may specify one or more locations in a file system that store files that may be used to develop a language model that is personalized for the information technology domain. Similarly, a sports journalist may specify one or more locations in a file system that store files that may be used to develop a language model that is personalized for the sports journalism domain. While a software developer may locally store documents that are related to sports, such a user may not identify such locations as locations to be used to personalize the language model. In a particular embodiment, a graphical user interface (GUI) may be provided to the user to identify such locations to be used in personalizing the language model.

Example Implementations

Figure 1:
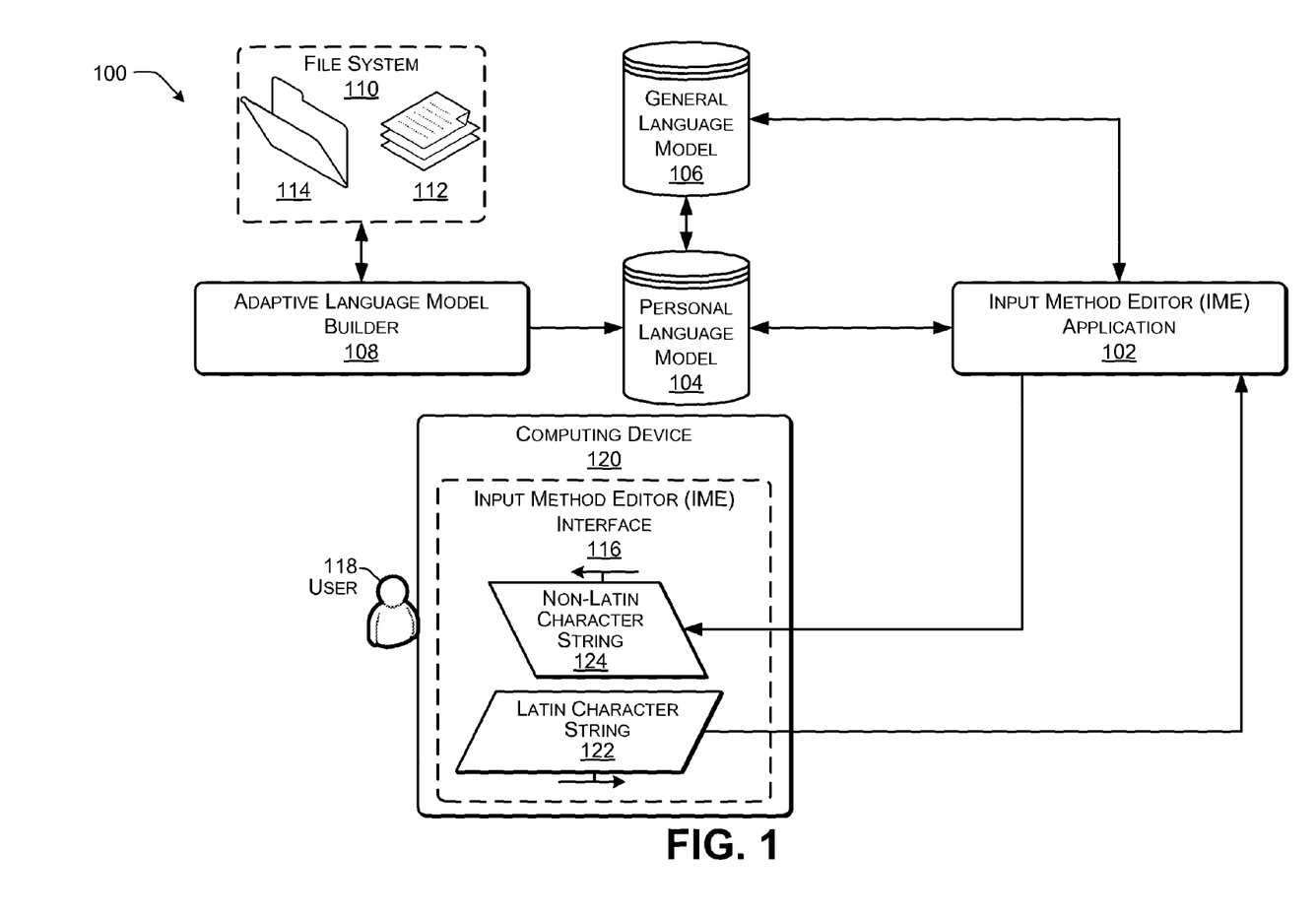
FIG. 1 illustrates an example system according to some implementations.

FIG. 1 illustrates an example framework of a system 100 according to some implementations. The system 100 includes an input method editor (IME) application 102 that is communicatively coupled to a personal language model 104 and a general language model 106. The system 100 further includes an adaptive language model builder 108 that is communicatively coupled to a file system 110. One or more files 112 are stored at one or more locations 114 in the file system 110. In a particular embodiment, the one or more locations 114 are identified by a user 118. While a computing device 120 is shown in FIG. 1 as separate from the above described components of the system 100, it will be appreciated that this is for illustrative purposes only. For instance, in some examples, all of the components of the system 100 may be included on the computing device 120, while in other examples, the components may be distributed across any number of computing devices able to communicate with one another, such as over one or more networks or other communication connections.

The IME application 102 is configured to generate an IME interface 116 for display to the user 118 via the computing device 120. The adaptive language model builder 108 is configured to generate the personal language model 104 based on linguistic characteristics of the one or more files 112 stored at the one or more locations 114 in the file system 110. The IME application 106 is further configured to receive a Latin character string 122 via the IME interface 116. In response to receiving the Latin character string 122, the IME application 106 is configured to predict a non-Latin character string 124 based at least in part on the personal language model 104.

The adaptive language model builder 108 may analyze the one or more files 112 and generate the personal language model 104 based on linguistic characteristics of the one or more files 112. For example, the personal language model 104 may include an N-gram statistical language model. Such an N-gram statistical language model may decompose the probability of a string of consecutive words into the products of the conditional probabilities between multiple (e.g., two, three, four, five, etc.) consecutive words in the string. Such analysis may be performed for each of the one or more files 112.

Some implementations provide a monitoring process that may detect that new content has been saved into the file system 110. In response to detecting that the new content has been saved, the adaptive language model builder 108 may process the new content to update the personal language model 104. Alternatively, a system service may periodically monitor the one or more locations 114 to determine whether new content has been saved to the one or more locations 114. In response to determining that new content has been saved, the adaptive language model builder 108 may process the new content to update the personal language model 104.

The IME application 102 receives the Latin character string 122 via the IME interface 116. As an illustrative example, the Latin character string 122 may include Pinyin text, and the predicted non-Latin character string 124 may include one or more Chinese characters.

A plurality of non-Latin character strings may be associated with the Latin character string 122 received via the IME interface 116. A conversion probability may be associated with each non-Latin character string of the plurality of non-Latin character strings. The IME application 102 may predict the non-Latin character string 124 for display to the user 118 based at least in part on the personal language model 104. In a particular embodiment, the IME application 102 predicts the non-Latin character string 124 by identifying the non-Latin character string with a highest conversion probability. The IME application 102 may order the plurality of non-Latin character strings based on the conversion probability and may display an ordered list of non-Latin character strings via the IME interface 116.

In some implementations, one or more predicted non-Latin character strings may be determined based on the personal language model 104 and the general language model 106. As an illustrative example, C may represent the Chinese string to be predicted, $P_m$ (C) may represent a probability determined based on the general language model 106, and $P_d$ (C) may represent a probability determined based on the personal language model 104. A contribution of the personal language model 104 may be determined based on a weighting factor (e.g., a value between 0 and 1, referred to herein as λ). That is, the probability of C may be determined based on the formula: $P(C)=\lambda P_m(C)+(1-\lambda)P_d(C)$.

In some implementations, the weighting factor may include a default weighting factor. That is, the weighting factor can be "pre-tuned" to a weighting factor that has been previously verified as accurate in most cases. In another embodiment, the weighting factor may include a user-defined weighting factor. For example, the user-defined weighting factor may be received from the user 118, and the weighting factor may be modified from the default weighting factor to the user-defined weighting factor. This may allow the user 118 to "tune" the weighting factor according to personal preference.

The general language model 106 may identify a first non-Latin character string as the non-Latin character string with the highest conversion probability. The personal language model 104 may identify a second non-Latin character string as the non-Latin character string with the highest conversion probability. The first non-Latin character string identified by the general language model 106 may be different than the second non-Latin character string identified by the personal language model 104.

As an illustrative example, the Latin character string 122 received from the user 118 may be the Pinyin text "wan'shang'shi'shi." For a journalist, the Chinese character string 晚上十时 (meaning "10 P.M.") may be more appropriate for display to the user 118 than the Chinese character string 晚上试试 (meaning "have a try in the evening") predicted by the general language model 106.

As another illustrative example, the Latin character string 122 received from the user 118 may be the Pinyin text "you'xiang'tu." For a software developer, the Chinese character string 有向图 (meaning "directed graph") may be more appropriate for display to the user 118 than the Chinese character string 油箱图 (meaning "gas tank diagram") predicted by the general language model 106.

Thus, FIG. 1 illustrates that the non-Latin character string 124 displayed via the IME interface 116 may vary depending on whether the personal language model 104 identifies the non-Latin character string 124 as more appropriate for display to the particular user 118 based on the linguistic characteristics of the one or more files 112 stored locally at the one or more locations 114.

Figure 2:
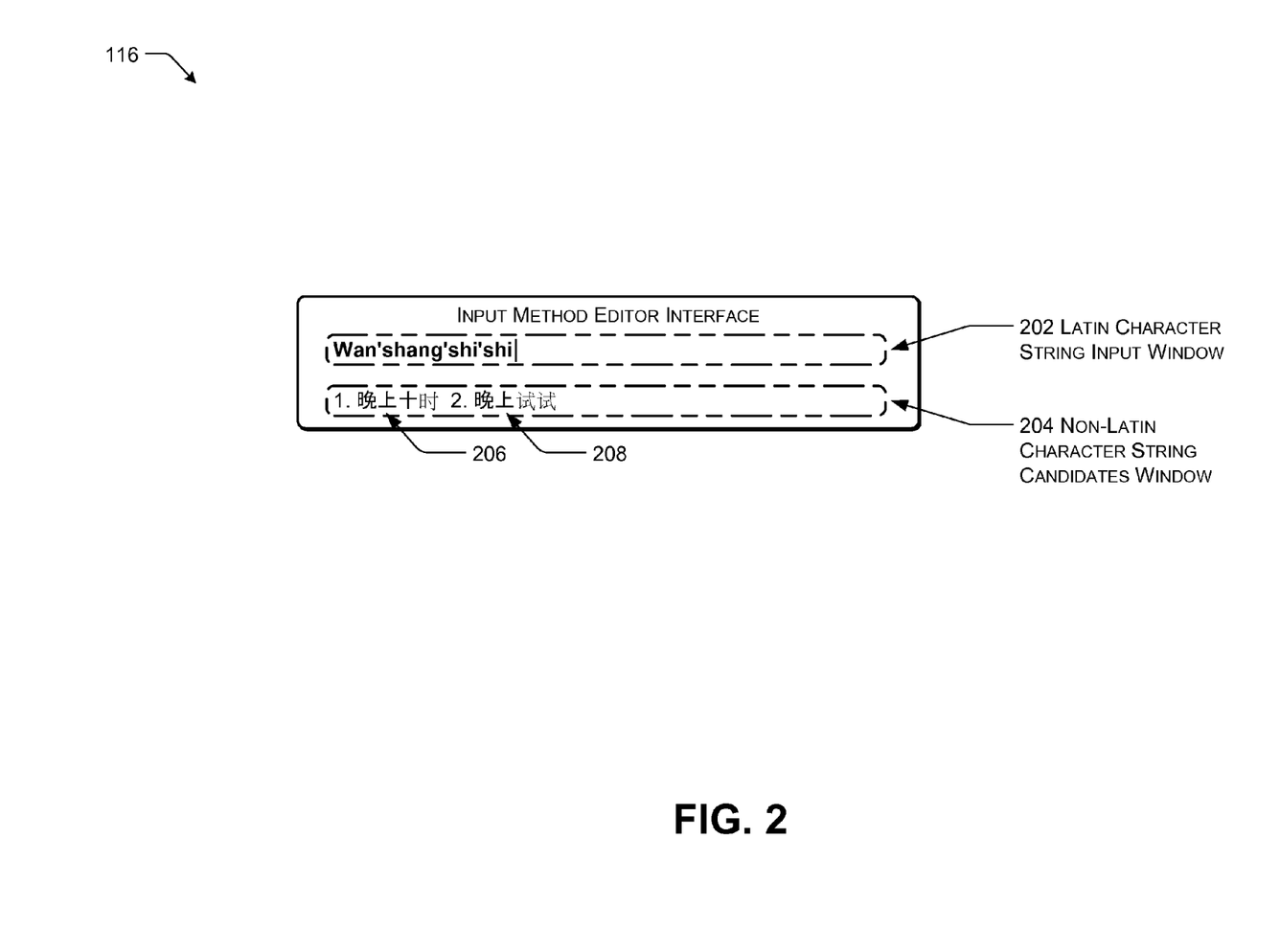
FIG. 2 illustrates an example input method editor interface according to some implementations.

FIG. 2 illustrates an example of an input method editor (IME) interface 116 according to some implementations. To illustrate, the IME interface 116 of FIG. 2 may correspond to the IME interface 116 of FIG. 1.

The IME interface 116 includes a Latin character string input window 202 and a non-Latin character string candidates window 204. The Latin character string input window 202 is configured to receive a Latin character string (e.g., the Latin character string 122 of FIG. 1). The non-Latin character string candidates window 204 is configured to display one or more non-Latin character string candidates.

FIG. 2 illustrates that a plurality of non-Latin (e.g., Chinese) character strings may be associated with the Latin character string received via the IME interface 116. A conversion probability may be associated with each of the non-Latin character strings. An IME application (e.g., the IME application 102 of FIG. 1) may order the non-Latin character strings based on conversion probability and may display an ordered list of non-Latin character strings via the IME interface 116.

In the example illustrated in FIG. 2, the Latin character string received via the Latin character string input window 202 may be the Pinyin text "wan'shang'shi'shi." The non-Latin character string candidates window 204 displays a first Chinese character string candidate 206 (i.e., 晚上十时) and a second Chinese character string candidate 208 (i.e., 晚上试试). For example, the personal language model 104 may identify the first Chinese character string candidate 206 (i.e., 晚上十时) as the Chinese character string with a highest conversion probability. The general language model 106 may identify the second Chinese character string candidate 208 (i.e., 晚上试试) as the Chinese character string with a highest conversion probability.

As explained above, the Chinese character string 晚上十时 (meaning "10 P.M.") may be more appropriate for a journalist than the Chinese character string 晚上试试 (meaning "have a try in the evening"). As such, the first Chinese character string candidate 206 (i.e., 晚上十时) predicted by the personal language model 104 may be identified as having a higher conversion probability than the second Chinese character string candidate 208 (i.e., 晚上试试) predicted by the general language model 106. Accordingly, the Chinese character string 晚上十时 may be presented as the first Chinese character string candidate 206 in the non-Latin character string candidates window 204.

In the example illustrated in FIG. 2, the Chinese character string 晚上试试 predicted by the general language model 106 is provided as the second Chinese character string candidate 208 in the non-Latin character string candidates window 204. However, it will be appreciated that alternative non-Latin character string candidates may be presented. For example, alternative Chinese character strings predicted by the personal language model 104 may be presented. Further, while only two candidates are illustrated in the non-Latin character string candidates window 204, alternative numbers of candidates may be displayed.

Figure 3:
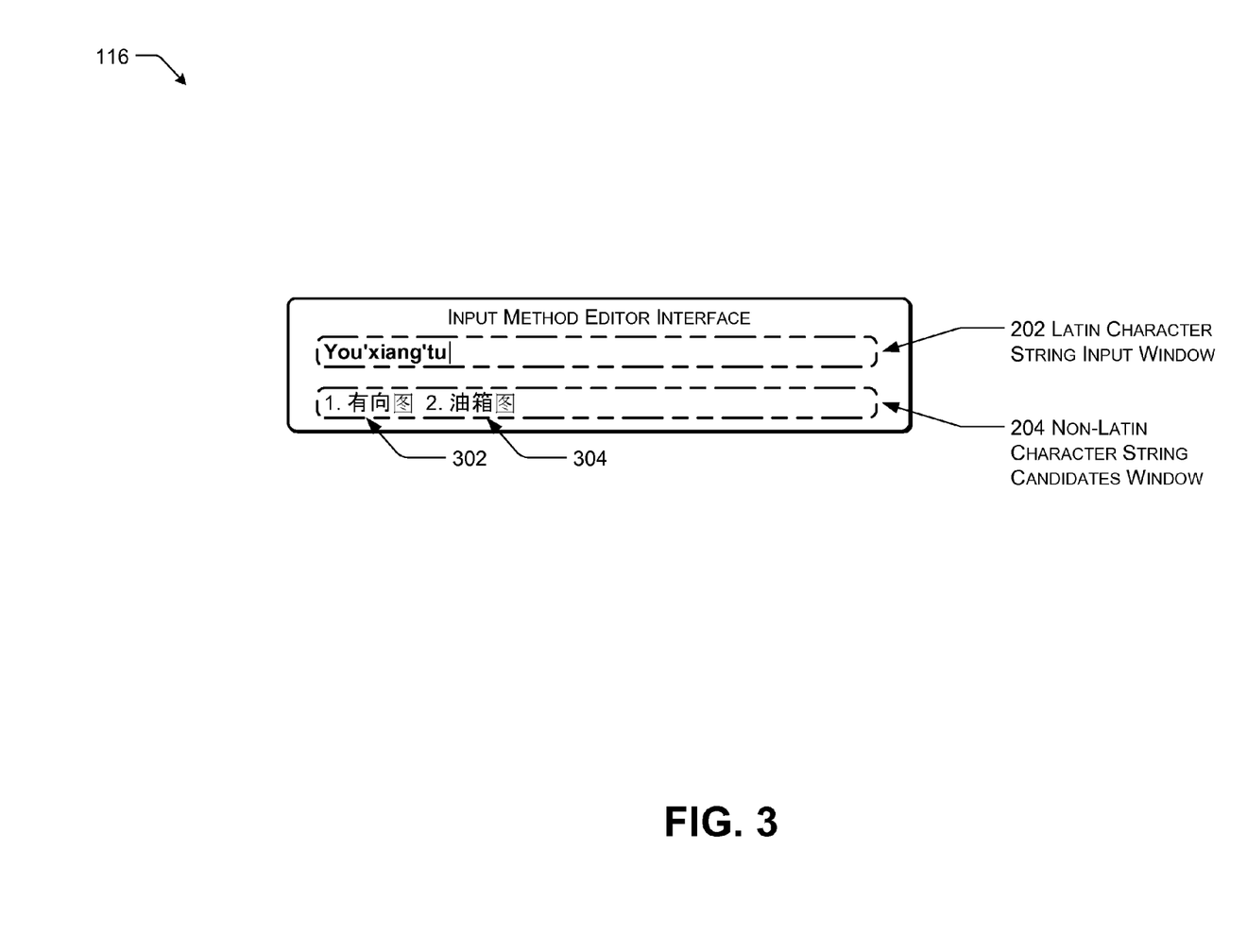
FIG. 3 illustrates an example input method editor interface according to some implementations.

FIG. 3 illustrates the exemplary input method editor interface 116 after receiving a Latin character string input that is different than the Latin character string input of FIG. 2.

In the example illustrated in FIG. 3, the Latin character string received via the Latin character string input window 202 may be the Pinyin text "you'xiang'tu." The non-Latin character string candidates window 204 displays a first Chinese character string candidate 302 (i.e., 有向图) and a second Chinese character string candidate 304 (i.e., 油箱图). As explained above, the Chinese character string 有向图 (meaning "directed graph") may be more appropriate for a software developer than the Chinese character string 油箱图 (meaning "gas tank diagram"). As such, the Chinese character string 有向图 may be presented as the first Chinese character string candidate 302 in the non-Latin character string candidates window 204.

In the example illustrated in FIG. 3, the Chinese character string 油箱图 is provided as the second Chinese character string candidate 304 in the non-Latin character string candidates window 204. However, it will be appreciated that alternative non-Latin character string candidates may be presented. Further, while only two candidates are illustrated in the non-Latin character string candidates window 204, alternative numbers of candidates may be displayed.

Figure 4:
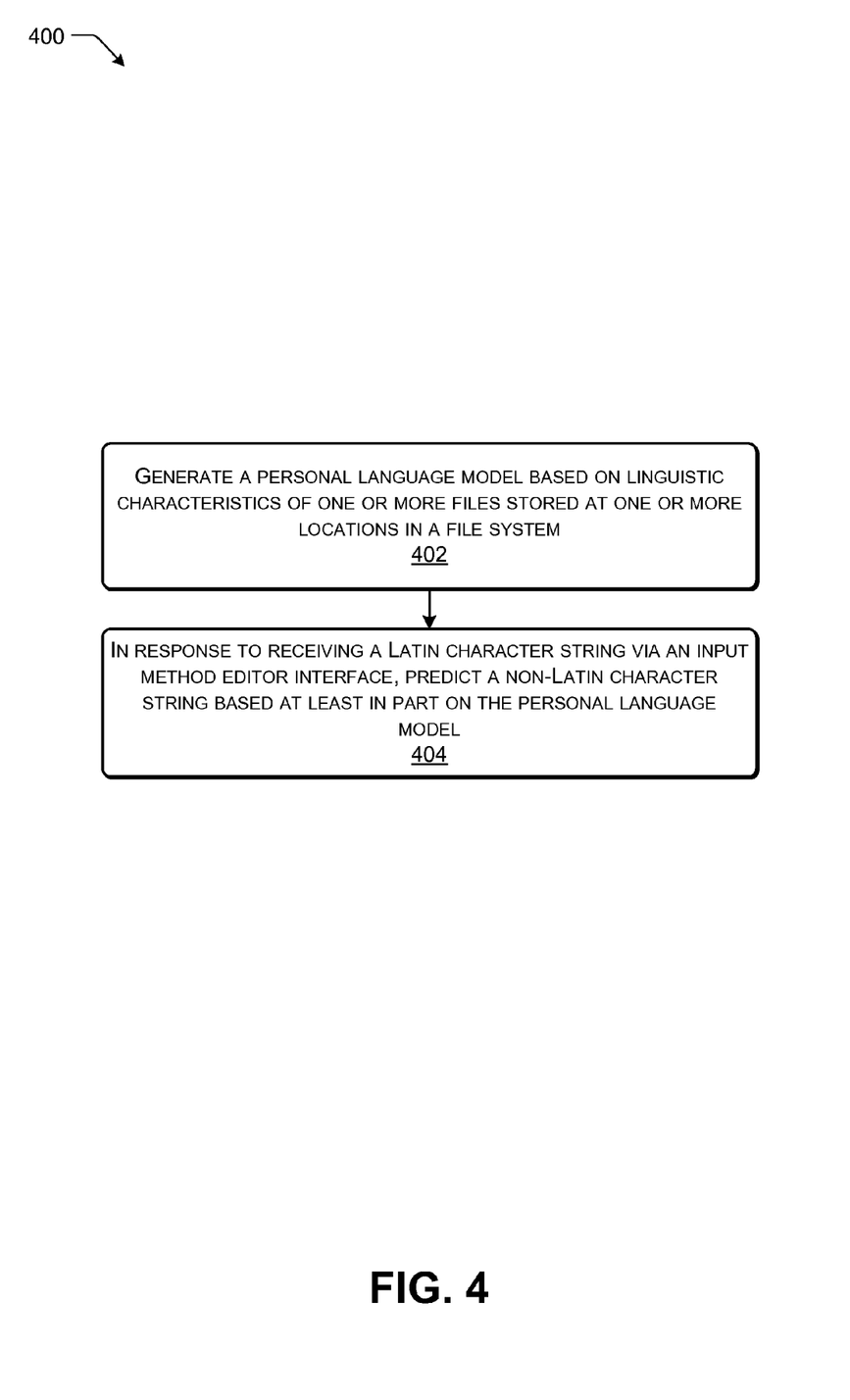
FIG. 4 illustrates an example process flow according to some implementations.
Figure 5:
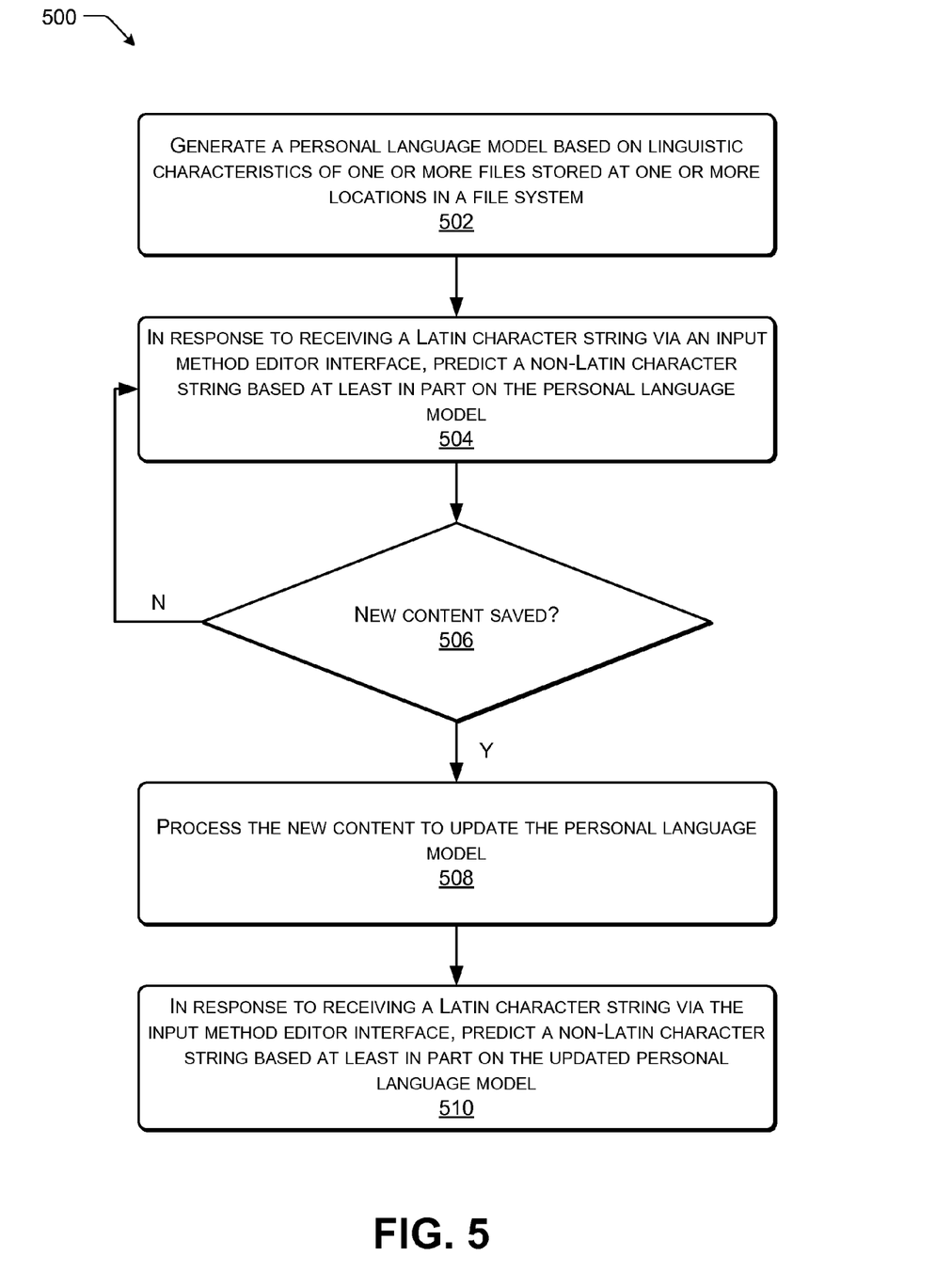
FIG. 5 illustrates an example process flow according to some implementations.

FIGS. 4 and 5 illustrate example process flows according to some implementations. In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. Numerous other variations will be apparent to those of skill in the art in light of the disclosure herein. For discussion purposes, the process flows 400 and 500 are described with reference to the system 100, described above, although other models, frameworks, systems and environments may implement the illustrated process.

Referring to FIG. 4, at block 402, the process flow 400 includes generating a personal language model based on linguistic characteristics of one or more files stored at one or more locations in a file system. For example, the IME application 102 of FIG. 1 may derive the personal language model 104 based on the linguistic characteristics of the one or more files 112 stored at the one or more locations 114 in the file system 110. As an illustrative, non-limiting example, an N-gram statistical language model may be employed to analyze the one or more files 112. Employing such an N-gram SLM, the general language model 106 may identify a first non-Latin character string as the non-Latin character string with the highest conversion probability. Employing the N-gram SLM to analyze the one or more files 112, the personal language model 104 may identify a second non-Latin character string as the non-Latin character string with the highest conversion probability. Depending on the linguistic characteristics of the one or more files 112, the second non-Latin character string predicted by the personal language model 104 may be different from the first non-Latin character string predicted by the general language model 106. Thus, the content of the one or more files 112 may affect a prediction of a non-Latin character string. Depending on the content of the one or more files 112, the predicted non-Latin character string may more accurately reflect the interests of the user 118.

At block 404, the process flow 400 includes predicting a non-Latin character string based at least in part on the personal language model, in response to receiving a Latin character string via an IME interface. For example, the IME application 102 of FIG. 1 may predict the non-Latin character string 124 based at least in part on the personal language model 104, in response to receiving the Latin character string 122 via the IME interface 116.

A plurality of non-Latin character strings may be associated with the Latin character string 122 received via the IME interface 116. Multiple non-Latin character strings may be displayed as candidates for user selection. A conversion probability may be associated with each of the non-Latin character string candidates. The conversion probability may be used to determine the order in which the non-Latin character string candidates are displayed.

As an illustrative example, FIG. 2 illustrates an ordered list of non-Latin character strings displayed in response to the user 118 providing the Pinyin text "wan'shang'shi'shi" via the Latin character string input window 202. The non-Latin character string candidates window 204 displays a first Chinese character string candidate 晚上十时 and a second Chinese character string candidate 晚上试 试 . In this case, the conversion probability associated with the first Chinese character string candidate 晚上十时 was determined to be higher than the conversion probability associated with the second Chinese character string candidate 晚上试试 .

As another illustrative example, referring to FIG. 3, the non-Latin character string candidates window 204 displays a first Chinese character string candidate 有向图 and a second Chinese character string candidate 油箱图 in response to the user 118 providing the Pinyin text "you'xiang'tu" via the Latin character string input window 202. In this case, the conversion probability associated with the first Chinese character string candidate 有向图 was determined to be higher than the conversion probability associated with the second Chinese character string candidate 有向图.

In a particular embodiment, the predicted non-Latin character string 124 is determined based on the personal language model 104 and the general language model 106. In one embodiment, the first Chinese character string candidate (e.g., 晚上十时 in FIG. 2 or 有向图 in FIG. 3) may represent the non-Latin character string with the highest conversion probability according to the personal language model 104. The second Chinese character string candidate (e.g., 晚上试试 in FIG. 2 or 油箱图 in FIG. 3) may represent the non-Latin character string with the highest conversion probability according to the general language model 106.

A contribution of the personal language model 104 may be determined based on a weighting factor. For example, the weighting factor may include a default weighting factor or a user-defined weighting factor. In the event that the user 118 determines that the order of the Chinese character string candidates is inappropriate, the user 118 may adjust the weighting factor accordingly.

FIG. 5 illustrates another example process flow according to some implementations. FIG. 5 illustrates that the personal language model may be updated based on new content being saved to one or more locations in a file system.

At block 502, the process flow 500 includes generating a personal language model based on linguistic characteristics of one or more files stored at one or more locations in a file system. For example, the IME application 102 of FIG. 1 may generate the personal language model 104 based on the linguistic characteristics of the one or more files 112 stored at the one or more locations 114 in the file system 110.

At block 504, the process flow 500 includes predicting a non-Latin character string based at least in part on the personal language model, in response to receiving a Latin character string via an input method editor interface. For example, the IME application 102 of FIG. 1 may predict the non-Latin character string 112 based at least in part on the personal language model 104, in response to receiving the Latin character string 120 via the IME interface 116.

At block 506, the process flow 500 includes determining whether new content has been saved. When it is determined that new content has been saved, the process flow 500 may proceed to block 508. When it is determined that new content has not been saved, the process flow 500 returns to block 504.

At block 508, the process flow 500 may include processing the new content to update the personal language model.

In one embodiment, at block 506, a monitoring process may detect when new content has been saved into the file system. For example, referring to FIG. 1, the monitoring process may detect when new content has been saved into the file system 110. When new content has been saved, a scan may be triggered to retrieve the new content, and the new content may be processed to update the personal language model. For example, the adaptive language model builder 108 of FIG. 1 may process the new content saved in the file system 110 to update the personal language model 104. In an alternative embodiment, at block 506, a system service may periodically monitor the file system for new content and then process the new content to update the personal language model. For example, referring to FIG. 1, the system service may monitor the file system 110 for new content and then process the new content to update the personal language model 104.

Thereafter, predicting a non-Latin character string may be based at least in part on the updated personal language model. For example, at block 510, a Latin character string may be received via the IME interface (e.g., the IME interface 116). In response to receiving this Latin character string, a non-Latin character string is predicted based at least in part on the updated personal language model.

In a particular illustrative embodiment, the Latin character string received at block 510 (i.e., after the personal language model has been updated) may be the same as the Latin character string received at block 504. Depending on the update to the personal language model resulting from the new content being saved, the predicted non-Latin character string may or may not be the same. That is, the update to the personal language model may or may not affect the prediction of the non-Latin character string. To illustrate, the personal language model prior to the update (i.e., the personal language model derived at 502) may have predicted a particular non-Latin character string. The updated personal language model (i.e., after the update at block 508) may predict the same non-Latin character string or may predict a different non-Latin character string.

Thus, updating the personal language model may affect a prediction associated with one or more Latin character strings but may not affect a prediction associated with other Latin character strings.

Figure 6:
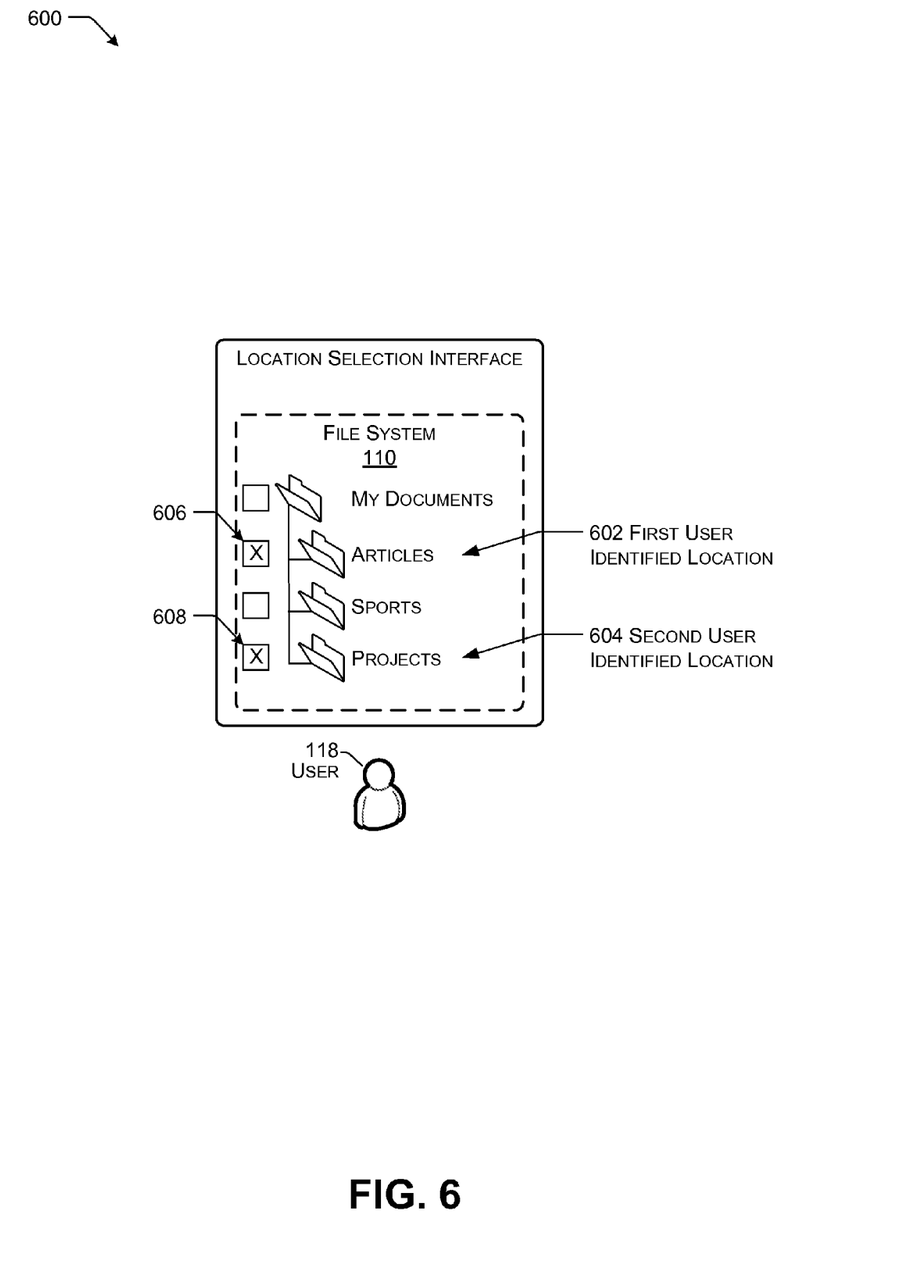
FIG. 6 illustrates an example location selection interface according to some implementations.

FIG. 6 illustrates an example location selection interface 600 according to some implementations. In a particular embodiment, the location selection interface 600 may be presented to the user 118 via the computing device 120 of FIG. 1. The location selection interface 600 may allow the user 118 to specify one or more locations in the file system 110 that store files that may be used to generate the personal language model 104.

In the example illustrated in FIG. 6, a first user identified location 602 and a second user identified location 604 have been identified by the user 118 as locations in the file system 110 that store files to be used in generating the personal language model 104. The location selection interface 600 may include multiple selectable location identifiers (e.g., check boxes, radio buttons). In the example illustrated in FIG. 6, a first selectable location identifier 606 associated with the first user identified location 602 and a second selectable location identifier 608 associated with the second user identified location 604 have been selected by the user 118. In this illustrative example, the user 118 has identified the "Articles" folder and the "Projects" folder under the "My Documents" folder. However, the user 118 has not identified the "Sports" folder. That is, the user 118 has specified that files in the "Articles" folder and files in the "Projects" folder should be used to generate the personal language model 104. However, the user 118 has specified that files in the "Sports" folder should not be used to generate the personal language model 104. In this example, the user 118 may be a software developer, and any files in the "Sports" folder may be inappropriate for use in generating a language model that is personalized for the information technology domain.

Example Computing Device and Environment

Figure 7:
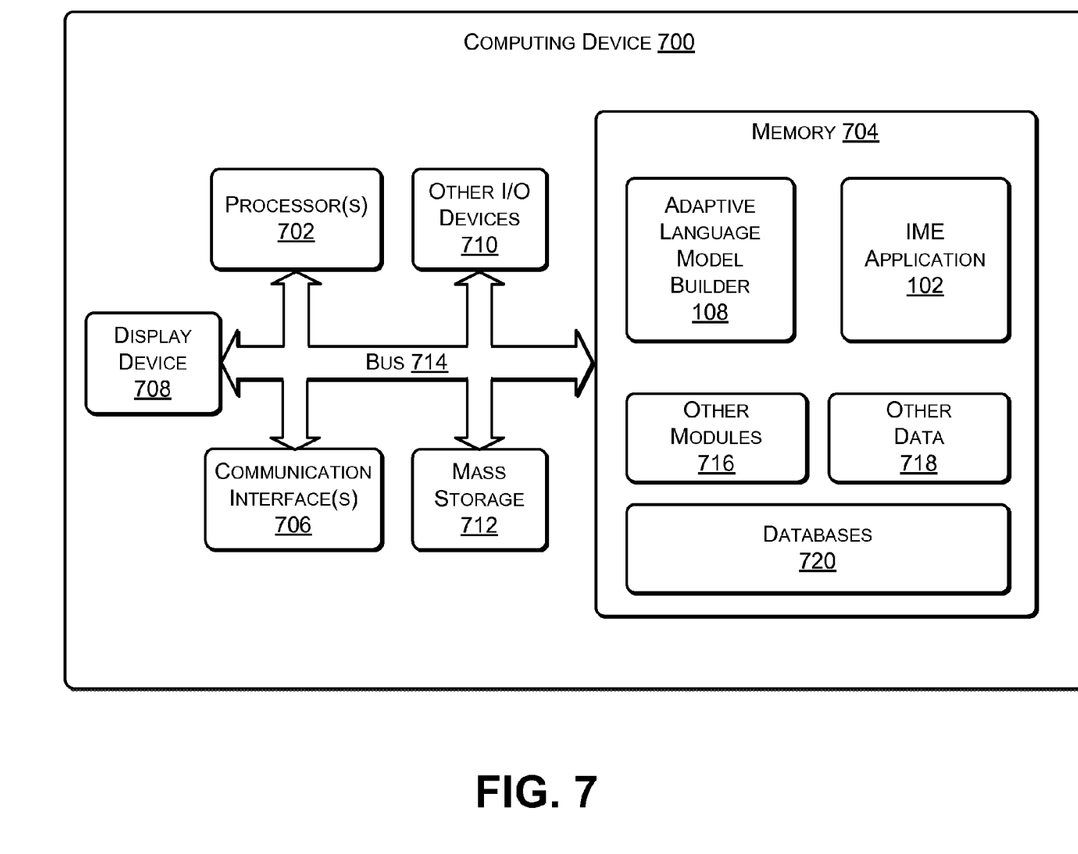
FIG. 7 illustrates an example system in which some implementations may operate.

FIG. 7 illustrates an example configuration of a computing device 700 and an environment that can be used to implement the modules and functions described herein. As shown in FIG. 7, the computing device 700 corresponds to the computing device 120 of FIG. 1 but it should be understood that the computing device 120 may be configured in a similar manner to that illustrated.

The computing device 700 may include at least one processor 702, a memory 704, communication interfaces 706, a display device 708 (e.g. a touchscreen display), other input/output (I/O) devices 710 (e.g. a touchscreen display or a mouse and keyboard), and one or more mass storage devices 712, able to communicate with each other, such as via a system bus 714 or other suitable connection.

The processor 702 may be a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 may generally include both volatile memory and non-volatile memory (e.g., RAM, ROM, or the like). Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be computer-readable media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data with other devices, such as via a network, direct connection, or the like, as discussed above. The communication interfaces 706 can facilitate communications within a wide variety of networks and protocol types, including wired networks (e.g., LAN, cable, etc.) and wireless networks (e.g., WLAN, cellular, satellite, etc.), the Internet and the like. Communication interfaces 706 can also provide communication with external storage (not shown), such as in a storage array, network attached storage, storage area network, or the like.

The discussion herein refers to data being sent and received by particular components or modules. This should not be taken as a limitation as such communication need not be direct and the particular components or module need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 708, such as touchscreen display or other display device, may be included in some implementations. The display device 708 may be configured to display the IME interface 116 as described above. Other I/O devices 710 may be devices that receive various inputs from a user and provide various outputs to the user, and may include a touchscreen, such as a touchscreen display, a keyboard, a remote controller, a mouse, a printer, audio input/output devices, and so forth.

Memory 704 may include modules and components for execution by the computing device 700 according to the implementations discussed herein. In the illustrated example, memory 704 includes the IME application 102 and the adaptive language model builder 108 as described above with regard to FIG. 1. Memory 704 may further include one or more other modules 716, such as an operating system, drivers, application software, communication software, or the like. Memory 704 may also include other data 718, such as data stored while performing the functions described above and data used by the other modules 716. Memory 704 may also include other data and data structures described or alluded to herein. For example, memory 704 may include information that is used in the course of deriving and generating the personal language model 104 as described above.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 7 as being stored in memory 704 of computing device 700, the IME application 102 and the adaptive learning model builder 108, or portions thereof, may be implemented using any form of computer-readable media that is accessible by computing device 700. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
   determining one or more locations amongst multiple different locations in a file system, the one or more locations storing one or more files associated with a domain of a user;
   generating, based at least in part on linguistic characteristics of the one or more files that are associated with the domain of the user, a personal language model for the user;

receiving a Latin character string via an input method editor interface;

determining, based at least in part on the personal language model, a first non-Latin character string that is associated with the Latin character string;

determining, based at least in part on a general language model, a second non-Latin character string that is associated with the Latin character string;

determining a first conversion probability for the first non-Latin character string;

determining a second conversion probability for the second non-Latin character string;

determining that the first conversion probability is higher than the second conversion probability; and predicting that the first non-Latin character string is associated with the Latin character string based at least in part on the determining that the first conversion probability is higher than the second conversion probability.

2. The method as recited in claim 1, further comprising outputting a graphical user interface that enables a user to identify the one or more locations as locations that contain content specific to the domain of the user, and the domain of the user is associated with at least one of a profession of the user or interests of the user.

3. The method as recited in claim 1, wherein a contribution of the personal language model is determined based at least in part on a weighting factor.

4. The method as recited in claim 3, wherein the weighting factor includes a default weighting factor or a user-defined weighting factor.

5. The method as recited in claim 1, further comprising presenting, based at least in part on the predicting, the first non-Latin character string via the input method editor interface.

6. The method as recited in claim 1, wherein:
the Latin character string includes a Pinyin character string; and
the first non-Latin character string and the second non-Latin character string include a Chinese character string.

7. The method as recited in claim 1, further comprising selecting the first non-Latin character string instead of the second non-Latin character string for display based at least in part on the determining that the first conversion probability is higher than the second conversion probability.

8. A computing system comprising:
one or more processors; and
one or more computer readable media maintaining instructions that, when executed by the one or more processors, cause the one or more processors to perform acts comprising:
determining one or more locations amongst multiple different locations in a file system, the one or more locations storing one or more files that are associated with a domain of a user;
generating, based at least in part on linguistic characteristics of the one or more files that are associated with the domain of the user, a personal language model for the user;
receiving a Latin character string via an input method editor interface;
determining, based at least in part on the personal language model, a first non-Latin character string that is associated with the Latin character string;

determining, based at least in part on a general language model, a second non-Latin character string that is associated with the Latin character string;
determining a first conversion probability for the first non-Latin character string;
determining a second conversion probability for the second non-Latin character string;
determining that the first conversion probability is higher than the second conversion probability; and
providing the first non-Latin character string based at least in part on the determining that the first conversion probability is higher than the second conversion probability.

9. The computing system as recited in claim 8, the acts further comprising:
detecting that new content has been saved; and
in response to detecting that the new content has been saved, processing the new content to update the personal language model.

10. The computing system as recited in claim 8, the acts further comprising:
periodically monitoring the one or more locations to determine whether new content has been saved to the one or more locations; and
processing the new content to update the personal language model.

11. The computing system as recited in claim 8, wherein the one or more locations are identified by the user via a location selection interface as locations that contain content specific to the domain of the user, and the domain of the user is associated with at least one of a profession of the user or interests of the user.

12. The computing system as recited in claim 8, the acts further comprising selecting the first non-Latin character string instead of the second non-Latin character string for display based at least in part on the determining that the first conversion probability is higher than the second conversion probability.

13. A computing system comprising:
one or more processors; and
one or more computer readable media maintaining instructions that, when executed by the one or more processors, cause the one or more processors to perform acts comprising:
determining one or more locations amongst multiple different locations in a file system, the one or more locations storing one or more files that are associated with a domain of a user;
generating, based at least in part on linguistic characteristics of the one or more files that are associated with the domain of the user, a personal language model for the user;
receiving a Latin character string via an input method editor interface;
determining, based at least in part on the personal language model, a first non-Latin character string that is associated with the Latin character string;
determining, based at least in part on a general language model, a second non-Latin character string that is associated with the Latin character string;
determining a first conversion probability for the first non-Latin character string;
determining a second conversion probability for the second non-Latin character string; and
determining that the second conversion probability is higher than the first conversion probability; and providing the second non-Latin character string based at least in part on the determining that the second conversion probability is higher than the first conversion probability.

14. The computing system as recited in claim 13, wherein the one or more locations are identified by the user via a location selection interface as locations that contain content specific to the domain of the user, and the domain of the user is associated with at least one of a profession of the user or interests of the user.

15. The computing system as recited in claim 13, the actus further comprising selecting the second non-Latin character string instead of the first non-Latin character string for display based at least in part on the determining that the second conversion probability is higher than the first conversion probability.

* * * * *